(12) United States Patent
Liu et al.

(10) Patent No.: US 12,352,576 B2
(45) Date of Patent: Jul. 8, 2025

(54) ATMOSPHERIC POLARIZED LIGHT ORIENTATION METHOD USING A SOLAR AZIMUTH REGION

(71) Applicant: NORTH UNIVERSITY OF CHINA, Taiyuan (CN)

(72) Inventors: Jun Liu, Taiyuan (CN); Xindong Wu, Taiyuan (CN); Chong Shen, Taiyuan (CN); Huiliang Cao, Taiyuan (CN); Jun Tang, Taiyuan (CN); Chenguang Wang, Taiyuan (CN)

(73) Assignee: NORTH UNIVERSITY OF CHINA, Taiyuan (CN)

( * ) Notice: Subject to any disclaimer, the term of this patent is extended or adjusted under 35 U.S.C. 154(b) by 103 days.

(21) Appl. No.: 18/531,770

(22) Filed: Dec. 7, 2023

(65) Prior Publication Data
US 2025/0044096 A1    Feb. 6, 2025

(51) Int. Cl.
| | | |
|---|---|---|
| *G01C 21/02* | (2006.01) | |
| *G06T 7/155* | (2017.01) | |
| *G06T 7/187* | (2017.01) | |
| *G06T 7/66* | (2017.01) | |
| *G06T 7/73* | (2017.01) | |

(52) U.S. Cl.
CPC ............ *G01C 21/02* (2013.01); *G06T 7/155* (2017.01); *G06T 7/187* (2017.01); *G06T 7/66* (2017.01); *G06T 7/73* (2017.01); *G06T 2207/20156* (2013.01)

(58) Field of Classification Search
None
See application file for complete search history.

(56) References Cited

U.S. PATENT DOCUMENTS

| | | | |
|---|---|---|---|
| 7,315,781 B2* | 1/2008 | Litchfield | ............... G01S 5/163 |
| | | | 701/408 |
| 9,109,947 B2* | 8/2015 | Vorovitchik | ........... G01C 21/02 |

OTHER PUBLICATIONS

Liang et al. Polarization Orientation Determination Algorithm Based on the Extremum of Moment of Inertia; Proceedings of the 37th Chinese Control Conference Jul. 25-27, 2018, Wuhan, China (Year: 2018).*

* cited by examiner

*Primary Examiner* — Abdhesh K Jha
(74) *Attorney, Agent, or Firm* — CBM PATENT CONSULTING, LLC

(57) ABSTRACT

It discloses an atmospheric polarized light orientation method using a solar azimuth region, provides an angle of polarization (AOP) vision-modulated model in a pixel frame, and gives an orientation strategy utilizing the solar azimuth region; a horizontal attitude angle is introduced into the AOP in the pixel frame, and orientation is implemented by utilizing a separation point and a principal point of photograph; specifically, a seed line extraction algorithm is given to update the solar azimuth in real time, a morphological expression and an AOP expression of the solar azimuth are fused for an optimum estimation to the solar azimuth, and ultimately the orientation is achieved by using an external sensor such as an inertial navigation system to input the horizontal attitude angle.

9 Claims, 3 Drawing Sheets

ATMOSPHERIC POLARIZED LIGHT ORIENTATION METHOD USING A SOLAR AZIMUTH REGION

CROSS-REFERENCE TO RELATED APPLICATIONS

This application claims priority to Chinese Patent Application Ser. No. CN2023109608581 filed on 1 Aug. 2023.

TECHNICAL FIELD

The invention belongs to the technical field of navigation, and specifically to an atmospheric polarized light orientation method using a solar azimuth region.

BACKGROUND

By detecting the regular pattern formed by the degree of polarization and angle of polarization (DOP/AOP) on the celestial sphere, a passive and cumulative error-free precise navigation can be achieved. At present, it is generally believed that an AOP model in the sky observed from the ground or near ground is the same in nature in all weather conditions. It is due to such robustness of the AOP model that a method utilizing AOP navigation is considered to hold tremendous potential. In general, according to different detection devices, a bionic polarization navigation method can be classified into photodiode-based point-source polarization navigation and image polarimeter-based imaging polarization navigation. The photodiode-based point-source polarization navigation requires the use of an additional sensor to solve the problem of sun blur. In such a method, a complex mechanical structure and a longer scanning time have to be used in the detection of large field of view. An AOP obtained in this way has a separate frame for each pixel, i.e., an incident light frame. Furthermore, due to its small field of view, this navigation is very susceptible to interference from weather, obstructions, and the like.

In order to solve the above problems, an imaging polarization navigation method utilizing an image polarimeter is proposed. However, it is regrettable that the polarization navigation method utilizing an image polarimeter now lacks theoretical model. In addition, the imaging polarization navigation method mainly starts from an AOP in an incident light frame, and an AOP in a pixel system is less studied. More importantly, there is a lack of pixel-based polarization navigation method in an inclined attitude. And the inability to solve the orientation problem in inclined attitude will likewise severely restrict the application of imaging polarization navigation method, and this navigation error is considered as the largest error source of polarization navigation method under clear sky.

SUMMARY

Objective of the invention: in order to solve the problem that existing navigation orientation method is not able to utilize the AOP in the pixel frame for navigation orientation under an inclined condition, the invention provides an atmospheric polarized light orientation method using a solar azimuth region.

Technical solution: an atmospheric polarized light orientation method using a solar azimuth region comprises a computer readable medium operable on a computer with memory for the atmospheric polarized light orientation method, and comprising program instructions for executing the following steps of:

step 1: detecting a four-channel polarization image by utilizing an image polarimeter, and calculating an AOP $\varphi^m$ according to the four-channel polarization image;

step 2: obtaining a solar elevation angle and a solar azimuth angle, obtaining an observation point elevation angle and an observation point azimuth angle, converting an AOP in an incident light frame into an AOP in a pixel frame by utilizing a theoretical AOP model of the pixel frame, establishing a theoretical model of the AOP, and ignoring a measured noise, wherein the obtained AOP is the AOP calculated by using the four-channel polarization image, and obtaining a relation between the AOP $\varphi_p^b$ and the solar azimuth angle $A_s^b$ through the theoretical model of the AOP;

step 3: extracting the solar azimuth region for the AOP $\varphi^m$ by utilizing a region growth model, setting an initial growth point as a principal point of photograph, performing region growth on a current AOP image at the initial growth point, and calculating a grown binary image; and filtering the grown binary image by utilizing the operation of image morphology, calculating a centroid of the filtered binary image, updating a seed line according to the centroid, and taking the updated seed line as an initial growth point of the next frame of AOP image for extracting the solar azimuth region; and step 4: calculating a first approximate solar azimuth angle $A_{s,f}^b$ according to the updated seed line; along the solar direction, dividing the binary image in the solar direction into image blocks with an equal field of view; and calculating a second approximate solar azimuth angle $A_{s,r}^b$ by utilizing the image blocks with an equal field of view, wherein all measured solar azimuth angles $\overline{Z}$ are represented as $\overline{Z}=[A_{s,r}^b, A_{s,f}^b]$; obtaining an optimum estimation $\hat{A}_s^b$ to the solar azimuth angle according to $\overline{Z}$, wherein $$\hat{A}_s^b = \arg\min_C \|\overline{Z} - C\|_2^2$$

is obtained and C is an unsolved value when the $\hat{A}_s^b$ reaches a minimum value;

calculating the horizontal attitude angle by an inertial navigation system, setting an absolute heading angle as $\psi$, and calculating the absolute heading angle $\psi$ by using the following equation according to all measured solar azimuth angles and their optimum estimations:

$$\psi = \text{solve}(\hat{A}_s^b - A_s^b = 0, \psi),$$

wherein, $A_s^b$ represents a solar azimuth angle in a body frame.

Further, the AOP is set as $\varphi^m$ in the step 1, and a calculation equation of the AOP is:

$$\varphi^m = 0.5 \arctan 2((I(45) - I(135)/(I(0) - I(90))), \quad (1)$$

wherein, I(*) represents a polarization intensity in a * direction.

Further, the AOP in the incident light frame in the step 2 is represented as follows:

$$\tan\varphi_{il} = \frac{\sinh_s\cosh_p - \cosh_s\sinh_p\cos(A_p - A_s)}{-\sin(A_p - A_s)\cosh_s}, \quad (2)$$

wherein, $h_s$ and $A_s$ are the solar elevation angle and the solar azimuth angle, and $h_p$ and $A_p$ are the observation point elevation angle and the observation point azimuth angle;

when the AOP in the incident light frame is converted into that in the pixel frame, the AOP $\varphi_p$ in the pixel frame is capable of being represented as:

$$\varphi_p = \arctan((A + B)/(1 - AB)), \quad (3)$$

in the equation:

$$A = \frac{\sinh_s\cosh_p - \cosh_s\sinh_p\cos(A_p - A_s)}{-\sin(A_p - A_s)\cosh_s} \quad (4)$$

$$B = \tan(\alpha),$$

wherein:

$$\alpha = \begin{cases} \arctan 2\left(\frac{x_p - x_c^p}{y_p - y_c^p}\right) & x_p \neq x_c^p, y_p \neq y_c^p \\ \pi/2 & x_p = x_c^p, y_p = y_c^p \end{cases} \quad (5)$$

$$h_p = \pi/2 - sc/rl\sqrt{(x_p - x_c^p)^2 + (y_p - y_c^p)^2} \quad (6)$$

$$A_p = \arctan 2(y_p - y_c^p, x_p - x_c^p),$$

in the equation, sc is the field of view, rl is a resolution, $(x_p, y_p)$ is a pixel point position in the pixel frame, and $(x_c^p, y_c^p)$ is a coordinate of the principal point of photograph in the pixel frame;

$\varphi_p$ is simplified to obtain an equation as follows:

$$\tan(-\varphi_p) = \frac{-y\sin(z)\sin(h_s) + x\sin(dA)\cos(h_s) + y\cos(z)\cos(dA)\cos(h_s)}{x\sin(z)\sin(h_s) + y\sin(dA)\cos(h_s) - x\cos(z)\cos(dA)\cos(h_s)}, \quad (7)$$

wherein:

$$x = x_p - x_c^p \quad (8)$$

$$y = y_p - y_c^p$$

$$z = sc/rl\sqrt{(x_p - x_c^p)^2 + (y_p - y_c^p)^2}$$

$$dA = A_s - \arctan 2(y_p - y_c^p, x_p - x_c^p),$$

by taking an observation direction as the solar direction, the above equation is simplified:

$$\varphi_p = \arctan(\tan(A_s)), \quad (9)$$

a three-axis attitude angle is introduced, and thus the AOP in the pixel frame is obtained in the same way:

$$\varphi_p^b = \arctan\left(\frac{\partial_1\partial_5 - \partial_2 + \partial_3 + \partial_4}{\partial_1 + \partial_2\partial_5 - \partial_3\partial_5 - \partial_4\partial_5}\right), \quad (10)$$

wherein:

$$\partial_1 = \sin(A_p - A_s^b)\cos(h_s^b), \quad (11)$$

$$\partial_2 = \cos(h_p)\sin(h_s^b), \quad (12)$$

$$\partial_3 = \cos(A_p)\cos(A_s^b)\cos(h_s^b)\sin(h_p), \quad (13)$$

$$\partial_4 = \sin(A_p)\sin(A_s^b)\cos(h_s^b)\sin(h_p), \quad (14)$$

$$\partial_5 = -x/y, \quad (15)$$

in the equation, the superscript b represents the body frame;

the above equation in the solar direction is simplified in the same way to obtain:

$$\varphi_p^b = \arctan(\tan(A_s^b)), \quad (16)$$

wherein, $A_s^b$ represents the solar azimuth angle in the body frame.

Further, the calculation method of the grown binary image $B_{AOP}(i, j)$ in the step 3 is:

$$B_{AOP}(i, j) = RG(\varphi^m), \quad (17)$$

wherein, i and j are the width and height of the pixel point, and RG represents the region growth model.

Further, the grown binary image is filtered by using shrinking and clearing operations of the image morphology in the step 3, and the filtered binary image $B_{SR}(i, j)$ is represented as:

$$B_{SR}(i, j) = C(S(B_{AOP}(i, j))). \quad (18)$$

Further, the calculation method of the centroid of the filtered binary image in the step 3 is:

$$x_s = \frac{m_{10}}{m_{00}}, \quad (19)$$

$$y_s = \frac{m_{01}}{m_{00}},$$

wherein:

$$m_{pq} = \sum_{i,j} i^p j^q B_{SR}(i, j), \quad (20)$$

$x_s$ and $y_s$ represent horizontal and vertical coordinates of the centroid respectively, $m_{pq}$ represents a calculated value of values p and q with $B_{SR}(i, j)$, $p,q \in 0,1$ and $m_{10}$ represent a calculated value when p is 1 and q is 0, $m_{01}$ represents a calculated value when p is 0 and q is 1; and moo represents a calculated value when p is 0 and q is 0.

Further, the updated seed line in the step 3 is represented as:

$$l_s: (Y - y_c^p)(X - x_c^p) = (Y - y_s)(X - x_s), \quad (21)$$

wherein, X and Y are an independent variable and a dependent variable in a line equation, and $(x_c^p, y_c^p)$ is a coordinate of the principal point of photograph in the pixel frame.

Further, the calculation method of the first approximate solar azimuth angle $A_{s,f}^b$ in the step 4 is:

$$A_{s,f}^b = \arctan\left(\frac{y_s - y_c^p}{x_s - x_c^p}\right). \quad (22)$$

Further, when the binary image in the solar direction is divided along the solar direction into n image blocks with an equal field of view in the step 4 and represented as $B_{AOP,1}(i, j)$, $B_{AOP,2}(i, j)$, ..., $B_{AOP,n}(i, j)$, a set of image blocks with an equal field of view $B_{FOV}(i, j)$ are represented as:

$$B_{FOV}(i, j) = [B_{AOP,1}(i, j), B_{AOP,2}(i, j), \ldots, B_{AOP,n}(i, j)], \quad (23)$$

a second approximate solar azimuth angle $A_{s,r}^b$ is calculated by utilizing the image block with an equal field of view:

$$A_{s,r}^b = \frac{1}{MN}\sum_{i=1}^{M}\sum_{j=1}^{N} B_{FOV}(i, j)\varphi_m, \quad (24)$$

wherein, M and N are the width and height of the pixel point position having a value of 1 in image blocks with an equal field of view.

step 5: improving an orientation accuracy and speed of atmospheric polarized light navigation based on the results of the atmospheric polarized light orientation method.

Beneficial effects: compared with existing polarized light orientation method, the AOP in a pixel frame is utilized by the invention for navigation, thereby simplifying an orientation flow of atmospheric polarized light navigation. An AOP vision-modulated model in the pixel frame is established, a solar azimuth region of an AOP image is morphologically expressed prior to orientation, and a navigation solution of an obtained solar azimuth region by introducing a seed line and a horizontal attitude angle is performed, thereby an accurate orientation of a polarized light compass under an inclined condition is achieved. An atmospheric polarized light orientation under an inclined condition can be achieved by the invention through directly utilizing the AOP in the pixel frame, and the problem of significant decrease in orientation accuracy caused by incline during atmospheric polarized light orientation can be solved, thereby the orientation accuracy and speed of atmospheric polarized light navigation are effectively improved.

DETAILED DESCRIPTION

The invention is further explained and illustrated below in conjunction with the accompanying drawings and specific embodiments.

Figure 1:
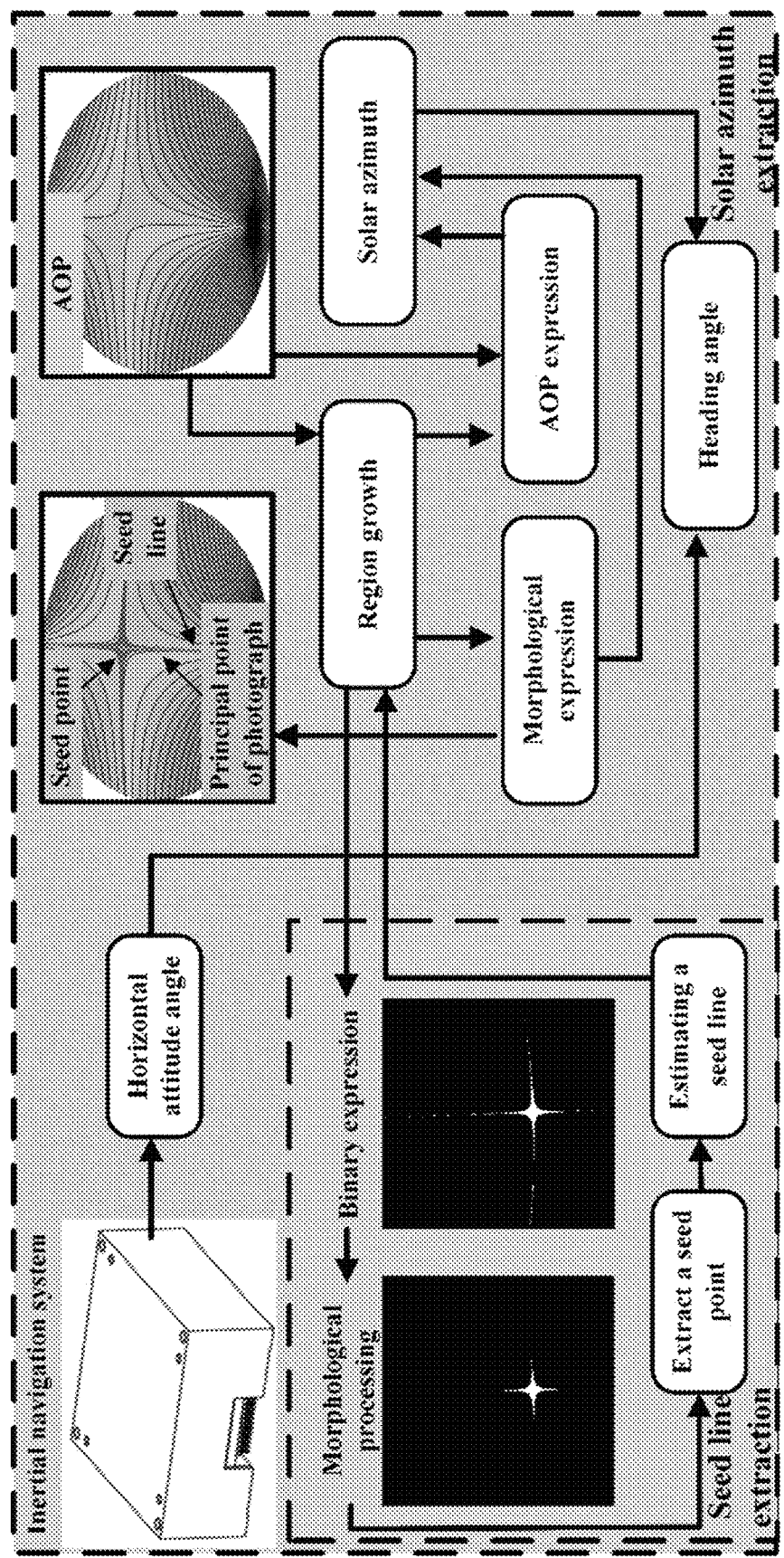
FIG. 1 is a flow diagram of an atmospheric polarized light orientation method using a solar azimuth region.

As shown in FIG. 1, an atmospheric polarized light orientation method using a solar azimuth region (SAO) comprises a computer readable medium operable on a computer with memory for the atmospheric polarized light orientation method, and comprising program instructions for executing the following steps of:

step 1: detecting a four-channel polarization image by utilizing an image polarimeter, and calculating an AOP $\varphi^m$ according to the four-channel polarization image, and the calculation formula is:

$$\varphi^m = 0.5\arctan 2((I(45) - I(135))/(I(0) - I(90))), \quad (1)$$

wherein, $I(*)$ represents a polarization intensity in a * direction.

step 2: establishing a theoretical model of the AOP, and obtaining a relation between the AOP $\varphi_p^b$ and the solar azimuth angle $A_s^b$ which lays the theoretical foundation for the subsequent calculations.

In order to realize a real-time navigation requirement, the AOP is simplified based on the theoretical AOP model in the pixel frame.

A solar elevation angle and a solar azimuth angle are obtained, an observation point elevation angle and an observation point azimuth angle are obtained, and an AOP in an incident light frame is converted into an AOP in the pixel frame by utilizing the theoretical AOP model of the pixel frame, a theoretical model of the AOP is established.

Specifically, in the calculation of theoretical AOP model in the pixel frame, it is assumed that the direction of electric vector is always perpendicular to a plane formed by the observation point, the solar projection point and the observer. Therefore, when observing the sun and dust points in the sky in the horizontal frame, a 3D model of the AOP in the incident light frame can be represented as:

$$\tan\varphi_{il} = \frac{\sinh_s \cosh_p - \cosh_s \sinh_p \cos(A_p - A_s)}{-\sin(A_p - A_s)\cosh_s}, \quad (2)$$

wherein $h_s$ and $A_s$ are the solar elevation angle and the solar azimuth angle, and $h_p$ and $A_p$ are the observation point elevation angle and the observation point azimuth angle;

when the AOP in the incident light frame is converted into that in the pixel frame, the AOP $\varphi_p$ in the pixel frame can be represented as:

$$\varphi_p = \arctan((A + B)/(1 - AB)), \quad (3)$$

in the equation:

$$A = \frac{\sinh_s \cosh_p - \cosh_s \sinh_p \cos(A_p - A_s)}{-\sin(A_p - A_s)\cosh_s}, \quad (4)$$

$$B = \tan(\alpha)$$

wherein:

$$\alpha = \begin{cases} \arctan 2\left(\frac{x_p - x_c^p}{y_p - y_c^p}\right) & x_p \neq x_z^p, y_p \neq y_c^p \\ \pi/2 & x_p = x_z^p, y_p = y_c^p \end{cases}, \quad (5)$$

$$h_p = \pi/2 - sc/rl\sqrt{(x_p - x_c^p)^2 + (y_p - y_c^p)^2}, \quad (6)$$

$$A_p = \arctan 2(y_p - y_c^p, x_p - x_c^p)$$

in the equation, sc is the field of view, rl is a resolution, $(x_p, y_p)$ is a pixel point position in the pixel frame, and $(x_c^P, y_c^P)$ is a coordinate of the principal point of photograph in the pixel frame;

$\varphi_p$ is simplified to obtain an equation as follows:

$$\tan(-\varphi_p) = \quad (7)$$
$$\frac{-y\sin(z)\sin(h_s) + x\sin(dA)\cos(h_s) + y\cos(z)\cos(dA)\cos(h_s)}{x\sin(z)\sin(h_s) + y\sin(dA)\cos(h_s) - x\cos(z)\cos(dA)\cos(h_s)},$$

wherein:

$$x = x_p - x_c^p, \quad (8)$$
$$y = y_p - y_c^p$$
$$z = sc/rl\sqrt{(x_p - x_c^p)^2 + (y_p - y_c^p)^2}$$
$$dA = A_s - \arctan 2(y_p - y_c^p, x_p - x_c^p)$$

by taking an observation direction as the solar direction, the above equation is simplified:

$$\varphi_p = \arctan(\tan(A_s)), \quad (9)$$

a three-axis attitude angle is introduced, and thus the AOP in the pixel frame is obtained in the same way:

$$\varphi_p^b = \arctan\left(\frac{\partial_1 \partial_5 - \partial_2 + \partial_3 + \partial_4}{\partial_1 + \partial_2 \partial_5 - \partial_3 \partial_5 - \partial_4 \partial_5}\right), \quad (10)$$

wherein:

$$\partial_1 = \sin(A_p - A_s^b)\cos(h_s^b), \quad (11)$$
$$\partial_2 = \cos(h_p)\sin(h_s^b), \quad (12)$$

-continued
$$\partial_3 = \cos(A_p)\cos(A_s^b)\cos(h_s^b)\sin(h_p), \quad (13)$$
$$\partial_4 = \sin(A_p)\sin(A_s^b)\cos(h_s^b)\sin(h_p), \quad (14)$$

$$\partial_5 = -x/y, \quad (15)$$

in the equation, the superscript b represents the body frame;

the above equation in the solar direction is simplified in the same way to obtain:

$$\varphi_p^b = \arctan(\tan(A_s^b)), \quad (16)$$

wherein, $A_s^b$ represents the solar azimuth angle in the body frame. When a measured noise is ignored, the obtained AOP is the AOP calculated by the four-channel polarization image, and thus a relation between the AOP and the solar azimuth angle is obtained through the theoretical model of the AOP. Therefore, navigation and orientation can be completed only by extracting the AOP in the solar direction.

step 3: performing a seed line extraction algorithm, extracting the solar azimuth region for the AOP by utilizing a region growth model, setting an initial growth point of the region growth model as a principal point of photograph, performing region growth on a current AOP image at the initial growth point, and calculating a grown binary image, wherein the calculation method of the grown binary image $B_{AOP}(i, j)$ is:

$$B_{AOP}(i, j) = RG(\varphi^m), \quad (17)$$

wherein, i and j are the width and height of the pixel point, and RG represents the region growth model.

The grown binary image is filtered by utilizing shrinking and clearing operations of the image morphology, and the filtered binary image $B_{SR}(i, j)$ is represented as:

$$B_{SR}(i, j) = C(S(B_{AOP}(i, j))), \quad (18)$$

The centroid of the filtered binary image is calculated by:

$$x_s = \frac{m_{10}}{m_{00}}, \quad (19)$$
$$y_s = \frac{m_{01}}{m_{00}},$$

wherein:

$$m_{pq} = \sum_{i,j} i^p j^q B_{SR}(i, j), \quad (20)$$

$x_s$ and $y_s$ represent horizontal and vertical coordinates of the centroid respectively, $m_{pq}$ represents a calculated value of values p and q with $B_{SR}(i, j)$, $p,q \in 0,1$ and $m_{10}$ represent a calculated value when p is 1 and q is 0, $m_{01}$ represents a calculated value when p is 0 and q is 1; and $m_{00}$ represents a calculated value when p is 0 and q is 0.

A seed line is updated according to the centroid, and the updated seed line is taken as an initial growth point of the next frame of AOP image for extracting the solar azimuth region, and the updated seed line is represented as:

$$l_s: (Y - y_c^p)(X - x_c^p) = (Y - y_s)(X - x_s), \qquad (21)$$

wherein, X and Y are an independent variable and a dependent variable in a line equation, and $(x_c^p, y_c^p)$ is a coordinate of the principal point of photograph in the pixel frame.

step 4: calculating a first approximate solar azimuth angle $A_{s,f}^b$ according to the updated seed line; and the calculation method is:

$$A_{s,f}^b = \arctan\left(\frac{y_s - y_c^p}{x_s - x_c^p}\right). \qquad (22)$$

when the binary image in the solar direction is divided along the solar direction into n image blocks with an equal field of view and represented as $B_{AOP,1}(i, j)$, $B_{AOP,2}(i, j), \ldots, B_{AOP,n}(i, j)$, a set of image blocks with an equal field of view $B_{FOV}(i, j)$ are represented as:

$$B_{FOV}(i, j) = [B_{AOP,1}(i, j), B_{AOP,2}(i, j), \ldots, B_{AOP,n}(i, j)], \qquad (23)$$

a second approximate solar azimuth angle $A_{s,r}^b$ is calculated by utilizing the image block with an equal field of view:

$$A_{s,r}^b = \frac{1}{MN}\sum_{i=1}^{M}\sum_{j=1}^{N} B_{FOV}(i, j)\varphi_m, \qquad (24)$$

wherein, M and N are the width and height of the pixel point position having a value of 1 in image blocks with an equal field of view.

At this point, all measured solar azimuth angles are represented as:

$$\bar{Z} = [A_{s,r}^b, A_{s,f}^b] \qquad (25)$$

obtaining an optimum estimation $\hat{A}_s^b$ to the solar azimuth angle according to $\bar{Z}$, wherein $$\hat{A}_s^b = \arg\min_{C}\|\bar{Z} - C\|_2^2$$

is obtained and C is an unsolved value when the $\hat{A}_s^b$ reaches a minimum value;

calculating the horizontal attitude angle by an inertial navigation system, setting an absolute heading angle as $\psi$, and calculating the absolute heading angle $\psi$ by using the following equation according to all measured solar azimuth angles and their optimum estimations:

$$\psi = \text{solve}(\hat{A}_s^b - A_s^b = 0, \psi), \qquad (26)$$

$$\hat{A}_s^b = \arg\min_{C}\|\bar{Z} - C\|_2^2, \qquad (27)$$

wherein, $A_s^b$ represents a solar azimuth angle in a body frame.

step 5: improving an orientation accuracy and speed of atmospheric polarized light navigation based on the results of the atmospheric polarized light orientation method.

Figure 2:
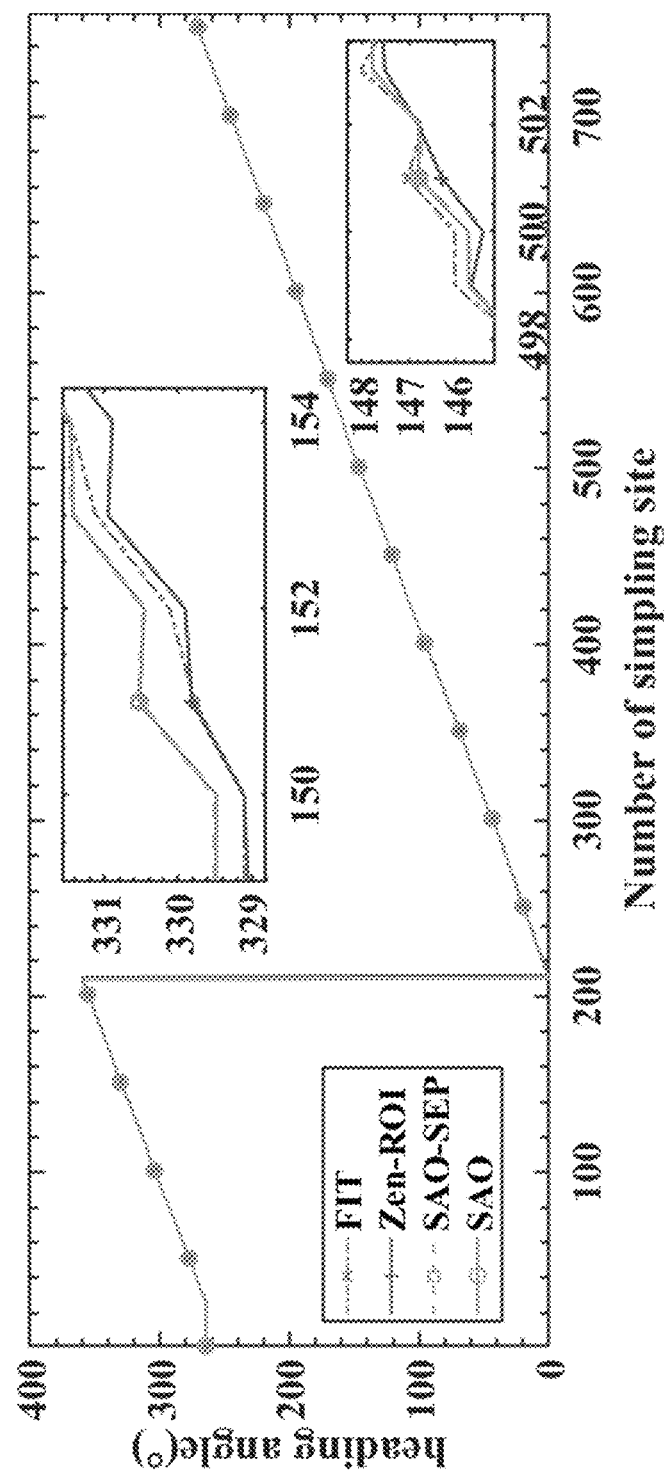
FIG. 2 is a comparison diagram of orientation results of various orientation methods at a heading angle of 360°.
Figure 3:
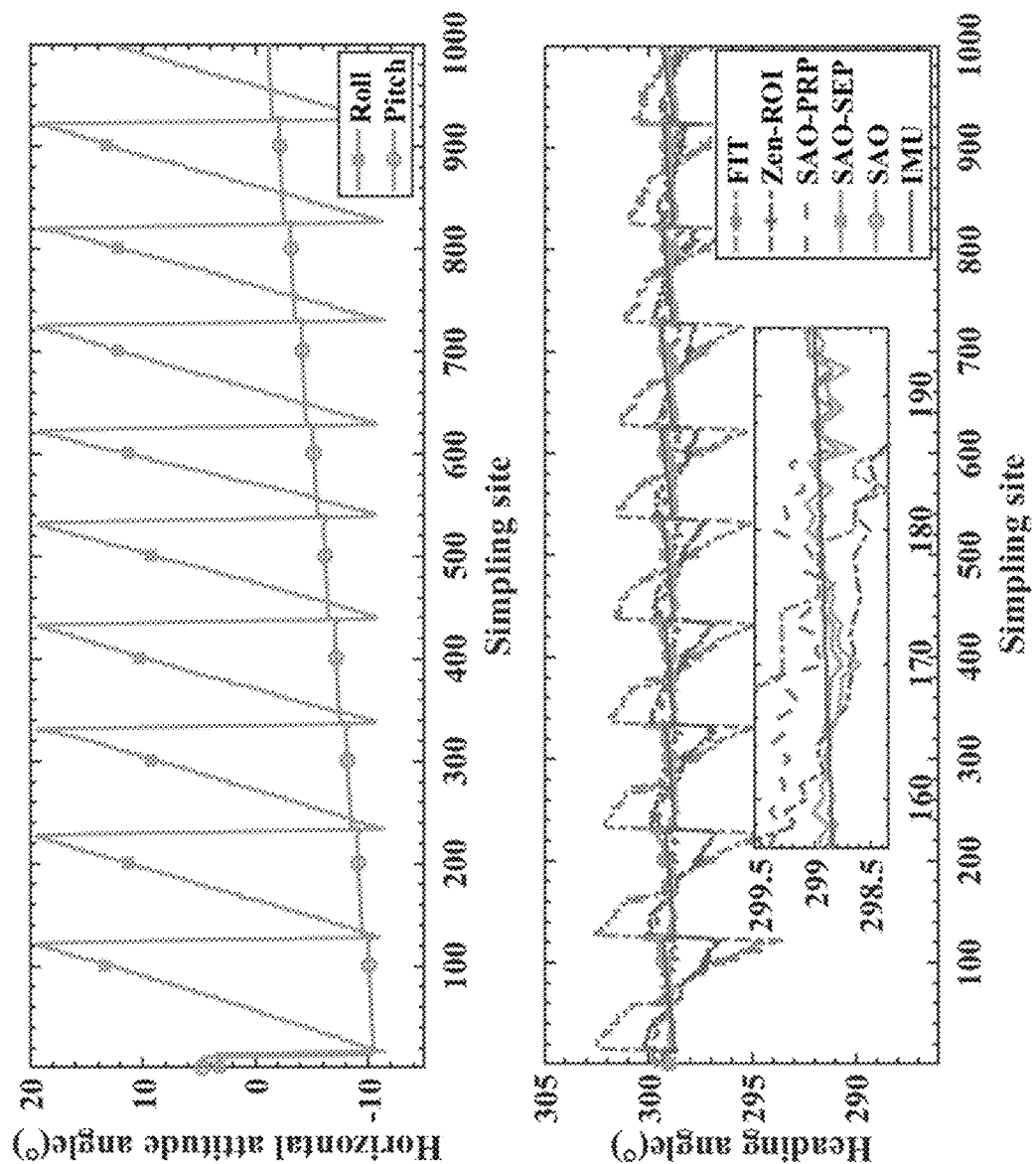
FIG. 3 is a comparison diagram of AOP errors of various orientation methods under an inclined condition.

To verify the effectiveness of this method, following comparative experiments were carried out. A polarization compass was built based on the LUCID PHX050S-P/Q polarization camera and TX2. FIG. 2 shows the orientation results of this method at a 360° heading angle. FIG. 3 shows the orientation results of this method under an inclined condition. Methods used for the comparative experiment include meridian fit, zenith region of interest (Zen-ROI), principal point region of photograph (SAO-PRP), separation point region (SAO-SEP), and solar azimuth region (SAO) proposed in this embodiment for which the reference value is provided by an inertial measurement unit (IMU), and the inclined angle is illustrated by using pitch angle (Pitch) and roll angle (Roll). As can be seen in FIG. 2 and FIG. 3, this method exhibits a highest accuracy at a 360° heading angle and under an inclined condition, and shows a good robustness under various conditions.

The foregoing is merely the preferred embodiment of the invention and should not be used to limit the invention. Any modifications, equivalent substitution, improvements, etc. made within the spirit and principle of the invention should be included in the protection scope of the invention.

What is claimed is:

1. An atmospheric polarized light orientation method using a solar azimuth region, comprising a computer readable medium operable on a computer with memory for the atmospheric polarized light orientation method, and comprising program instructions for executing the following steps of:

step 1: detecting a four-channel polarization image by utilizing an image polarimeter, and calculating an AOP $\varphi^m$ according to the four-channel polarization image;

step 2: obtaining a solar elevation angle and a solar azimuth angle, obtaining an observation point elevation angle and an observation point azimuth angle, converting an AOP in an incident light frame into an AOP in a pixel frame by utilizing a theoretical AOP model of the pixel frame, establishing a theoretical model of the AOP, and ignoring a measured noise, wherein the obtained AOP is the AOP calculated by using the four-channel polarization image, and obtaining a relation between the AOP $\varphi_p^b$ and the solar azimuth angle $A_s^b$ through the theoretical model of the AOP;

step 3: extracting the solar azimuth region for the AOP $\varphi^m$ by utilizing a region growth model, setting an initial growth point as a principal point of photograph, performing region growth on a current AOP image at the initial growth point, and calculating a grown binary image; and filtering the grown binary image by utilizing the operation of image morphology, calculating a centroid of the filtered binary image, updating a seed line according to the centroid, and taking the updated seed line as an initial growth point of the next frame of AOP image for extracting the solar azimuth region;

step 4: calculating a first approximate solar azimuth angle $A_{s,f}^b$ according to the updated seed line; along the solar direction, dividing the binary image in the solar direction into image blocks with an equal field of view; and calculating a second approximate solar azimuth angle $A_{s,r}^b$ by utilizing the image blocks with an equal field of view, wherein all measured solar azimuth angles $\bar{z}$ are represented as $\bar{Z}=[A_{s,r}^b, A_{s,f}^b]$; obtaining an optimum estimation $\hat{A}_s^b$ to the solar azimuth angle according to $\bar{z}$, wherein $$\hat{A}_s^b = \arg\min_C \|\bar{Z} - C\|_2^2,$$

is obtained and C is an unsolved value when the $\hat{A}_s^b$ reaches a minimum value;

calculating the horizontal attitude angle by an inertial navigation system, setting an absolute heading angle as $\psi$, and calculating the absolute heading angle $\psi$ by using the following equation according to all measured solar azimuth angles and their optimum estimations:

$$\psi = \text{solve}(\hat{A}_s^b - A_s^b = 0, \psi),$$

wherein, $A_s^b$ represents a solar azimuth angle in a body frame;

step 5: improving an orientation accuracy and speed of atmospheric polarized light navigation based on the results of the atmospheric polarized light orientation method.

2. The atmospheric polarized light orientation method using the solar azimuth region according to claim 1, wherein when the absolute heading angle is set as $\varphi^m$ in the step 1, and a calculation equation of the AOP is:

$$\varphi^m = 0.5 \arctan 2((I(45) - I(135))/(I(0) - I(90))), \quad (1)$$

wherein, I(*) represents a polarization intensity in a * direction.

3. The atmospheric polarized light orientation method using the solar azimuth region according to claim 1, wherein the AOP in the incident light frame in the step 2 is represented as:

$$\tan \varphi_{il} = \frac{\sinh_s \cosh_p - \cosh_s \sinh_p \cos(A_p - A_s)}{-\sin(A_p - A_s)\cosh_s}, \quad (2)$$

wherein, $h_s$ and $A_s$ are the solar elevation angle and the solar azimuth angle, and $h_p$ and $A_p$ are the observation point elevation angle and the observation point azimuth angle;

when the AOP in the incident light frame is converted into that in the pixel frame, the AOP $\varphi_p$ in the pixel frame is capable of being represented as:

$$\varphi_p = \arctan((A + B)/(1 - AB)), \quad (3)$$

in the equation:

$$A = \frac{\sinh_s \cosh_p - \cosh_s \sinh_p \cos(A_p - A_s)}{-\sin(A_p - A_s)\cosh_s} \quad (4)$$

$$B = \tan(\alpha),$$

wherein:

$$\alpha = \begin{cases} \arctan 2\left(\frac{x_p - x_c^p}{y_p - y_c^p}\right) & x_p \neq x_c^p, y_p \neq y_c^p \\ \pi/2 & x_p = x_c^p, y_p = y_c^p \end{cases}, \quad (5)$$

$$h_p = \pi/2 - sc/rl\sqrt{(x_p - x_c^p)^2 + (y_p - y_c^p)^2} \quad (6)$$

$$A_p = \arctan 2(y_p - y_c^p, x_p - x_c^p),$$

in the equation, sc is the field of view, rl is a resolution, $(x_p, y_p)$ is a pixel point position in the pixel frame, and $(x_c^p, y_c^p)$ is a coordinate of the principal point of photograph in the pixel frame;

$\varphi_p$ is simplified to obtain an equation as follows:

$$\tan(-\varphi_p) = \frac{-y\sin(z)\sin(h_s) + x\sin(dA)\cos(h_s) + y\cos(z)\cos(dA)\cos(h_s)}{x\sin(z)\sin(h_s) + y\sin(dA)\cos(h_s) - x\cos(z)\cos(dA)\cos(h_s)}, \quad (7)$$

wherein:

$$x = x_p - x_c^p \quad (8)$$
$$y = y_p - y_c^p$$
$$z = sc/rl\sqrt{(x_p - x_c^p)^2 + (y_p - y_c^p)^2}$$
$$dA = A_s - \arctan 2(y_p - y_c^p, x_p - x_c^p),$$

by taking an observation direction as the solar direction, the above equation is simplified:

$$\varphi_p = \arctan(\tan(A_s)), \quad (9)$$

a three-axis attitude angle is introduced, and thus the AOP in the pixel frame is obtained in the same way:

$$\varphi_p^b = \arctan\left(\frac{\partial_1 \partial_5 - \partial_2 + \partial_3 + \partial_4}{\partial_1 + \partial_2 \partial_5 - \partial_3 \partial_5 - \partial_4 \partial_5}\right), \quad (10)$$

wherein:

$$\partial_1 = \sin(A_p - A_s^b)\cos(h_s^b), \quad (11)$$
$$\partial_2 = \cos(h_p)\sin(h_s^b), \quad (12)$$
$$\partial_3 = \cos(A_p)\cos(A_s^b)\cos(h_s^b)\sin(h_p), \quad (13)$$
$$\partial_4 = \sin(A_p)\sin(A_s^b)\cos(h_s^b)\sin(h_p), \quad (14)$$
$$\partial_5 = -x/y, \quad (15)$$

in the equation, the superscript b represents the body frame;

the above equation in the solar direction is simplified in the same way to obtain:

$$\varphi_p^b = \arctan(\tan(A_s^b)), \qquad (16)$$

wherein, $A_s^b$ represents the solar azimuth angle in the body frame.

4. The atmospheric polarized light orientation method using the solar azimuth region according to claim 1, wherein a calculation method of the grown binary image $B_{AOP}(i, j)$ in the step 3 is:

$$B_{AOP}(i, j) = RG(\varphi^m), \qquad (17)$$

wherein, i and j are the width and height of the pixel point, and RG represents the region growth model.

5. The atmospheric polarized light orientation method using the solar azimuth region according to claim 4, wherein the grown binary image is filtered by using shrinking and clearing operations of the image morphology in the step 3, and the filtered binary image $B_{SR}(i, j)$ is represented as:

$$B_{SR}(i, j) = C(S(B_{AOP}(i, j))). \qquad (18)$$

6. The atmospheric polarized light orientation method using the solar azimuth region according to claim 5, wherein a calculation method of the centroid of the filtered binary image in the step 3 is:

$$x_s = \frac{m_{10}}{m_{00}}, \; y_s = \frac{m_{01}}{m_{00}}, \qquad (19)$$

wherein:

$$m_{pq} = \sum_{i,j} i^p j^q B_{SR}(i, j), \qquad (20)$$

$x_s$ and $y_s$ represent horizontal and vertical coordinates of the centroid respectively, $m_{pq}$ represents a calculated value of values p and q with $B_{SR}(i, j)$, $p,q \in 0,1$ and $m_{10}$ represent a calculated value when p is 1 and q is 0, $m_{01}$ represents a calculated value when p is 0 and q is 1; and $m_{00}$ represents a calculated value when p is 0 and q is 0.

7. The atmospheric polarized light orientation method using the solar azimuth region according to claim 6, wherein the updated seed line in the step 3 is represented as follows:

$$l_s: (Y - y_c^p)(X - x_c^p) = (Y - y_s)(X - x_s), \qquad (21)$$

wherein, X and Y are an independent variable and a dependent variable in a line equation, and $(x_c^p, y_c^p)$ is a coordinate of the principal point of photograph in the pixel frame.

8. The atmospheric polarized light orientation method using the solar azimuth region according to claim 7, wherein a calculation method of the first approximate solar azimuth angle $A_{s,f}^b$ in the step 4 is:

$$A_{s,f}^b = \arctan\left(\frac{y_s - y_c^p}{x_s - x_c^p}\right). \qquad (22)$$

9. The atmospheric polarized light orientation method using the solar azimuth region according to claim 4, wherein when the binary image in the solar direction is divided along the solar direction into n image blocks with an equal field of view in the step 4 and represented as $B_{AOP,1}(i, j)$, $B_{AOP,2}(i, j)$, ..., $B_{AOP,n}(i, j)$, a set of image blocks with an equal field of view $B_{FOV}(i, j)$ are represented as:

$$B_{FOV}(i, j) = [B_{AOP,1}(i, j), B_{AOP,2}(i, j), \ldots, B_{AOP,n}(i, j)], \qquad (23)$$

a second approximate solar azimuth angle $A_{s,r}^b$ is calculated by utilizing the image block with an equal field of view:

$$A_{s,r}^b = \frac{1}{MN}\sum_{i=1}^{M}\sum_{j=1}^{N} B_{FOV}(i, j)\varphi_m, \qquad (24)$$

wherein, M and N are the width and height of the pixel point position having a value of 1 in image blocks with an equal field of view.

* * * * *